United States Patent
Sbaiz et al.

(10) Patent No.: US 9,319,486 B2
(45) Date of Patent: Apr. 19, 2016

(54) PREDICTING INTEREST LEVELS ASSOCIATED WITH PUBLICATION AND CONTENT ITEM COMBINATIONS

(71) Applicant: Google Inc., Mountain View, CA (US)

(72) Inventors: Luciano Sbaiz, Canton of Zurich (CH); Dimitre Trendafilov, Canton of Schwyz (CH)

(73) Assignee: Google Inc., Mountain View, CA (US)

(*) Notice: Subject to any disclaimer, the term of this patent is extended or adjusted under 35 U.S.C. 154(b) by 266 days.

(21) Appl. No.: 14/037,010

(22) Filed: Sep. 25, 2013

(65) Prior Publication Data

US 2015/0088801 A1    Mar. 26, 2015

(51) Int. Cl.

| | | |
|---|---|---|
| G06F 9/44 | (2006.01) | |
| G06N 7/02 | (2006.01) | |
| G06N 7/08 | (2006.01) | |
| H04L 29/06 | (2006.01) | |
| H04L 29/08 | (2006.01) | |
| G06Q 10/10 | (2012.01) | |
| G06N 7/04 | (2006.01) | |
| G06N 5/04 | (2006.01) | |
| G06N 7/00 | (2006.01) | |
| G06N 99/00 | (2010.01) | |

(52) U.S. Cl.
CPC ............... *H04L 67/42* (2013.01); *G06Q 10/10* (2013.01); *H04L 67/22* (2013.01); *H04L 67/26* (2013.01); *H04L 67/306* (2013.01); *G06N 5/04* (2013.01); *G06N 5/048* (2013.01); *G06N 7/005* (2013.01); *G06N 7/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,438,579 B1 * | 8/2002 | Hosken | 709/203 |
| 6,973,459 B1 * | 12/2005 | Yarmus | 707/778 |
| 7,424,439 B1 | 9/2008 | Fayyad et al. | |
| 7,882,046 B1 | 2/2011 | Kizhakkekalathil et al. | |
| 8,489,515 B2 | 7/2013 | Mathur | |
| 2005/0021397 A1 | 1/2005 | Cui et al. | |
| 2007/0157228 A1 | 7/2007 | Bayer et al. | |
| 2009/0164301 A1 | 6/2009 | O'Sullivan et al. | |
| 2009/0234784 A1 | 9/2009 | Buriano et al. | |
| 2011/0282745 A1 * | 11/2011 | Meoded et al. | 705/14.61 |
| 2011/0320261 A1 * | 12/2011 | Kadambi et al. | 705/14.42 |
| 2012/0036037 A1 * | 2/2012 | Xiao et al. | 705/26.7 |
| 2012/0310735 A1 | 12/2012 | Kniaz et al. | |
| 2012/0317066 A1 * | 12/2012 | Miyazaki | 706/46 |
| 2013/0152039 A1 * | 6/2013 | Kemmler | 717/101 |
| 2013/0346197 A1 * | 12/2013 | Zhou et al. | 705/14.53 |
| 2014/0032468 A1 * | 1/2014 | Anandaraj | 706/46 |
| 2014/0040370 A1 | 2/2014 | Buhr | |

* cited by examiner

*Primary Examiner* — Kakali Chaki
*Assistant Examiner* — Ababacar Seck
(74) *Attorney, Agent, or Firm* — Foley & Lardner LLP; John D. Lanza; James De Vellis

(57) ABSTRACT

A method of predicting interest levels associated with publication and content item combinations is described. Additionally, a server computing device for predicting interest levels associated with publication and content item combinations is described. Further, a computer-readable storage device having processor-executable instructions embodied thereon is described. The processor-executable instructions are for predicting interest levels associated with publication and content item combinations.

23 Claims, 9 Drawing Sheets

PREDICTING INTEREST LEVELS ASSOCIATED WITH PUBLICATION AND CONTENT ITEM COMBINATIONS

BACKGROUND

This description relates to presenting content items in combination with publications, and more particularly to predicting viewer interest levels associated with different combinations of publications and content items.

In at least some known systems, a server computing device transmits a publication (e.g., a video or a web page) in combination with a content item (e.g., an advertisement) to a client computing device for display on the client computing device. The selection of a content item to be transmitted in combination with the publication is based on matching a content item to a set of keywords ("vertical") associated with the publication. In some known implementations, the content item is displayed as a video clip on the client computing device prior to showing the publication, which is also a video. A user of the client computing device may choose to skip the content item, for example after five seconds of the content item have played, to view the publication. Such an occurrence lowers a view-through-rate ("VTR") assigned to the content item. In other implementations, a content item is displayed within a publication that is a web page. If the user clicks on the content item to visit a landing page, the click-through-rate ("CTR") of the content item increases. The VTR and the CTR are both indications of viewer interest levels in their respective content items. It would be beneficial to have a system for predicting viewer interest levels for different combinations of publications and content items to serve more relevant content items for any given publication.

BRIEF DESCRIPTION OF DISCLOSURE

In one aspect, a method of predicting interest levels associated with publication and content item combinations is provided. The method implemented by a server computing device that is communicatively coupled to at least one client computing device. The method includes determining a first interest level associated with a first combination including a first publication and a first set of keywords used for selecting a first content item to be displayed in conjunction with the first publication. The method also includes determining a second interest level associated with a second combination including a second publication and a second set of keywords used for selecting a second content item to be displayed in conjunction with the second publication. Additionally, the method includes determining a first dependency of the first interest level on the first set of keywords and a second dependency of the first interest level on a first provider of publications associated with the first publication. Further, the method includes determining a third dependency of the second interest level on the second set of keywords and a fourth dependency of the second interest level on a second provider of publications associated with the second publication. Additionally, the method includes generating (i) a proposed combination of the first publication and one of the first set of keywords and the second set of keywords and (ii) a predicted interest level associated with the proposed combination, based at least on the first dependency, the second dependency, the third dependency, and the fourth dependency.

In another aspect, a server computing device for predicting interest levels associated with publication and content item combinations is provided. The server computing device is communicatively coupled to a database and to at least one client computing device. The server computing device is configured to determine a first interest level associated with a first combination including a first publication and a first set of keywords used for selecting a first content item to be displayed in conjunction with the first publication. The server computing device is further configured to determine a second interest level associated with a second combination including a second publication and a second set of keywords used for selecting a second content item to be displayed in conjunction with the second publication. Additionally, the server computing device is configured to determine a first dependency of the first interest level on the first set of keywords and a second dependency of the first interest level on a first provider of publications associated with the first publication. Additionally, the server computing device is configured to determine a third dependency of the second interest level on the second set of keywords and a fourth dependency of the second interest level on a second provider of publications associated with the second publication. Additionally, the server computing device is configured to generate (i) a proposed combination of the first publication and one of the first set of keywords and the second set of keywords and (ii) a predicted interest level associated with the proposed combination, based at least on the first dependency, the second dependency, the third dependency, and the fourth dependency.

In another aspect, a computer-readable storage device having processor-executable instructions embodied thereon is provided. The processor-executable instructions are for predicting interest levels associated with publication and content item combinations, wherein when executed by a server computing device communicatively coupled to a database and to the at least one client computing device, the processor-executable instructions cause the server computing device to determine a first interest level associated with a first combination including a first publication and a first set of keywords used for selecting a first content item to be displayed in conjunction with the first publication. The instructions further cause the server computing device to determine a second interest level associated with a second combination including a second publication and a second set of keywords used for selecting a second content item to be displayed in conjunction with the second publication, determine a first dependency of the first interest level on the first set of keywords and a second dependency of the first interest level on a first provider of publications associated with the first publication, determine a third dependency of the second interest level on the second set of keywords and a fourth dependency of the second interest level on a second provider of publications associated with the second publication, and generate (i) a proposed combination of the first publication and one of the first set of keywords and the second set of keywords and (ii) a predicted interest level associated with the proposed combination, based at least on the first dependency, the second dependency, the third dependency, and the fourth dependency.

In another aspect, a server computing device for predicting interest levels associated with publication and content item combinations is provided. The server computing device is communicatively coupled to a database and to at least one client computing device. The server computing device includes means determining a first interest level associated with a first combination including a first publication and a first set of keywords used for selecting a first content item to be displayed in conjunction with the first publication. Additionally, the server computing device includes means for determining a second interest level associated with a second combination including a second publication and a second set of keywords used for selecting a second content item to be displayed in conjunction with the second publication. Additionally, the server computing device includes means for determining a first dependency of the first interest level on the first set of keywords and a second dependency of the first interest level on a first provider of publications associated with the first publication. Additionally, the server computing device includes means for determining a third dependency of the second interest level on the second set of keywords and a fourth dependency of the second interest level on a second provider of publications associated with the second publication. Additionally, the server computing device includes means for generating (i) a proposed combination of the first publication and one of the first set of keywords and the second set of keywords and (ii) a predicted interest level associated with the proposed combination, based at least on the first dependency, the second dependency, the third dependency, and the fourth dependency.

In another aspect, a server computing device as described above is provided, wherein the server computing device additionally includes means for transmitting the first publication and a third content item based on the proposed combination to the at least one client computing device for display.

In another aspect, a server computing device as described above is provided, wherein the server computing device additionally includes means for including the first set of keywords in a first vertical and including the second set of keywords in a second vertical.

In another aspect, a server computing device as described above is provided, wherein the means for determining the first interest level further includes means for one of determining a click through rate and a view through rate of the first content item.

In another aspect, a server computing device as described above is provided, further including means for determining an average interest level for each of the first provider of publications and the second provider of publications.

In another aspect, a server computing device as described above is provided, further including means for determining an average interest level associated with the first provider, determining a variance in the average interest level associated with the first provider, and generating a confidence level of the predicted interest level based at least in part on the variance.

In another aspect, a server computing device as described above is provided, further including means for arranging the first combination, the second combination, the first set of keywords, the second set of keywords, the first provider of publications, and the second provider of publications as nodes in a Bayesian network, wherein the nodes are connected by the first dependency, the second dependency, the third dependency, and the fourth dependency.

In another aspect, a server computing device as described above is provided, wherein the proposed combination is a first proposed combination and the predicted interest level is a first predicted interest level, and wherein said server computing device further includes means for generating at least a second proposed combination and a second predicted interest level associated with the second proposed combination, and determining that the first predicted interest level is greater than the second predicted interest level.

In another aspect, a server computing device as described above is provided, wherein the means for determining a third dependency and a fourth dependency further includes means for determining a third dependency of the second interest level on second set of keywords and a fourth dependency of the second interest level on a second provider of publications that is different from the first provider of publications.

In another aspect, a server computing device as described above is provided, wherein the means for determining a second interest level further includes means for determining a second interest level associated with a second combination including a second publication and a second set of keywords that is different from the first set of keywords.

In another aspect, a server computing device as described above is provided, wherein the means for determining a first interest level further includes means for determining a first interest level associated with a first combination including a first publication and a first set of keywords, wherein the first set of keywords is based on characteristics of the first publication.

In another aspect, a server computing device as described above is provided, wherein the means for determining a first interest level further includes means for determining a first interest level associated with a first combination including a first publication and a first set of keywords used for selecting a first content item, wherein the first set of keywords is based on characteristics of the first content item.

In another aspect, a server computing device as described above is provided, wherein the means for determining a first interest level further includes means for determining a first interest level associated with a first combination including a first publication and a first set of keywords used for selecting a first content item, wherein the first publication is a video and the first content item is combined with the video such that the first content item is displayed prior to displaying the video on the at least one client computing device.

The features, functions, and advantages described herein may be achieved independently in various embodiments of the present disclosure or may be combined in yet other embodiments, further details of which may be seen with reference to the following description and drawings.

Figure 1:
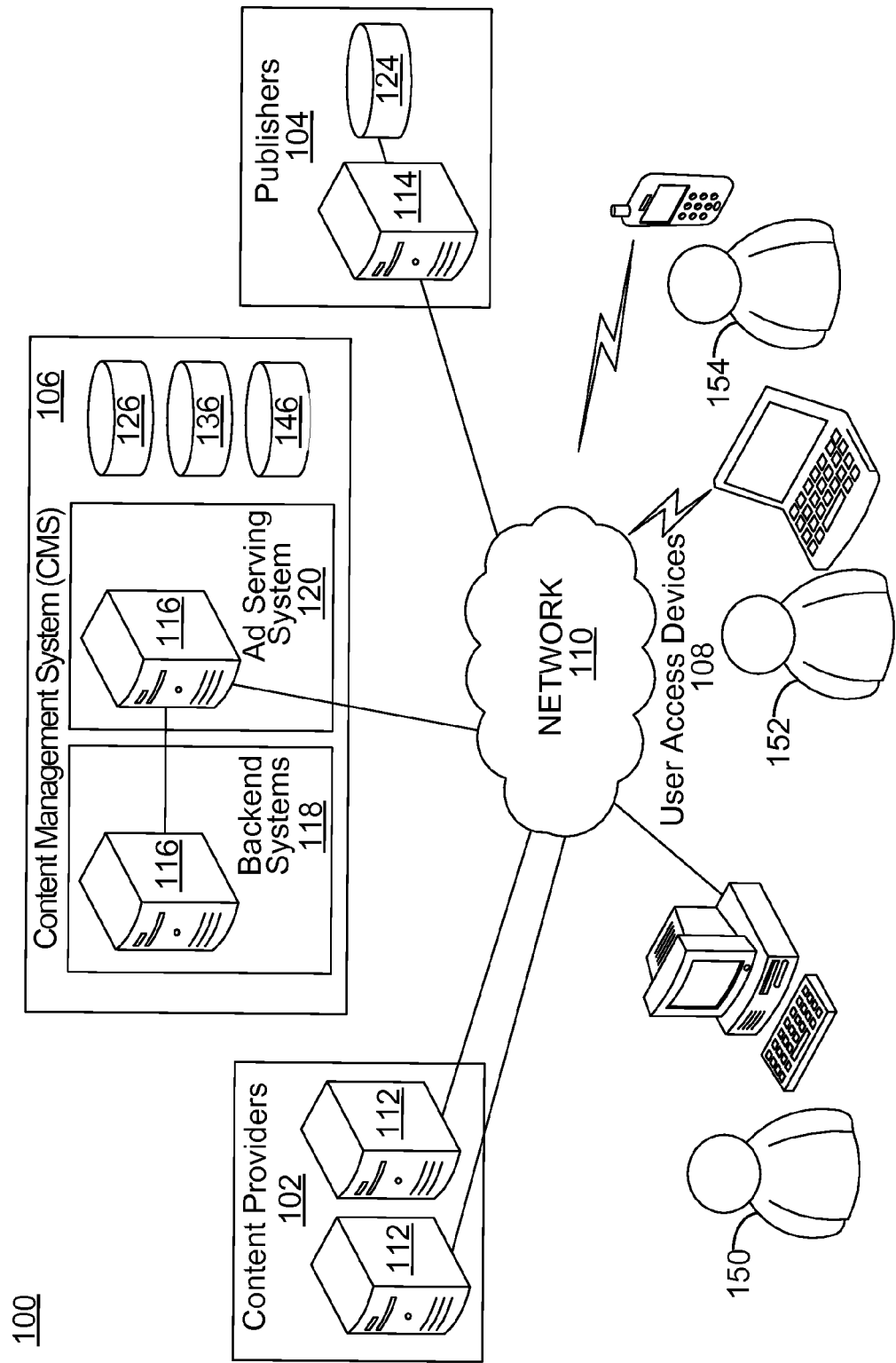
FIG. 1 is a diagram depicting an example networked environment.

Although specific features of various embodiments may be shown in some drawings and not in others, this is for convenience only. Any feature of any drawing may be referenced and/or claimed in combination with any feature of any other drawing.

DETAILED DESCRIPTION OF DISCLOSURE

The following detailed description of implementations refers to the accompanying drawings. The same reference numbers in different drawings may identify the same or similar elements. Also, the following detailed description does not limit the claims.

This subject matter described herein relates to presenting content items in combination with publications and, more specifically, predicting an interest level (e.g., a click-through-rate ("CTR") or a view-through-rate ("VTR")) associated with a combination of a publication and a set of keywords used to select a content item to display in combination with the publication, on a client computing device. Content items are, for example, advertisements associated with goods or services.

Embodiments of the described methods and systems determine how multiple factors associated with a combination of a publication (e.g., a video or a document) and a vertical (also referred to as "a set of keywords") associated with a content item (e.g., an advertisement) displayed in conjunction with a publication influence an interest level associated with the combination. A set of keywords may include only one keyword or multiple keywords. Accordingly, a vertical may include only one keyword or multiple keywords. More specifically, a first VTR or CTR is determined for a first combination, and a second VTR or CTR is determined for a second combination. The first combination is associated with a first provider of publications and the second combination is associated with a second provider of publications. A provider of publications may be, for instance, an author of publications or a channel or distribution source through which authors distribute publications. A first average interest level associated with publications from the first provider is determined and a second average interest level is determined for publications from the second provider. Dependencies of the interest level of each combination on their associated verticals and providers are determined. Based on the determined dependencies, a proposed combination of a publication and a vertical is generated that has a predicted interest level. In some implementations, in addition to determining an average interest level for each provider, a variance in the interest level is determined for each provider. The variance is used to provide a confidence level for the predicted interest level of the proposed combination. Additionally, in some implementations, the combinations, providers, and verticals are arranged as nodes in a network, such as a Bayesian network.

In situations in which the systems discussed herein collect personal information about users, or may make use of personal information, the users may be provided with an opportunity to control whether programs or features collect user information (e.g., information about a user's social network, social actions or activities, profession, interests, preferences, or current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined Thus, the user may have control over how information is collected about the user and used by a content server.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) determining a first interest level associated with a first combination including a first publication and a first set of keywords used for selecting a first content item to be displayed in conjunction with the first publication; (b) determining a second interest level associated with a second combination including a second publication and a second set of keywords used for selecting a second content item to be displayed in conjunction with the second publication; (c) determining a first dependency of the first interest level on the first set of keywords and a second dependency of the first interest level on a first provider of publications associated with the first publication; (d) determining a third dependency of the second interest level on the second set of keywords and a fourth dependency of the second interest level on a second provider of publications associated with the second publication; and (e) generating (i) a proposed combination of the first publication and one of the first set of keywords and the second set of keywords and (ii) a predicted interest level associated with the proposed combination, based at least on the first dependency, the second dependency, the third dependency, and the fourth dependency.

FIG. 1 is a diagram depicting an example networked environment. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or front-end modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
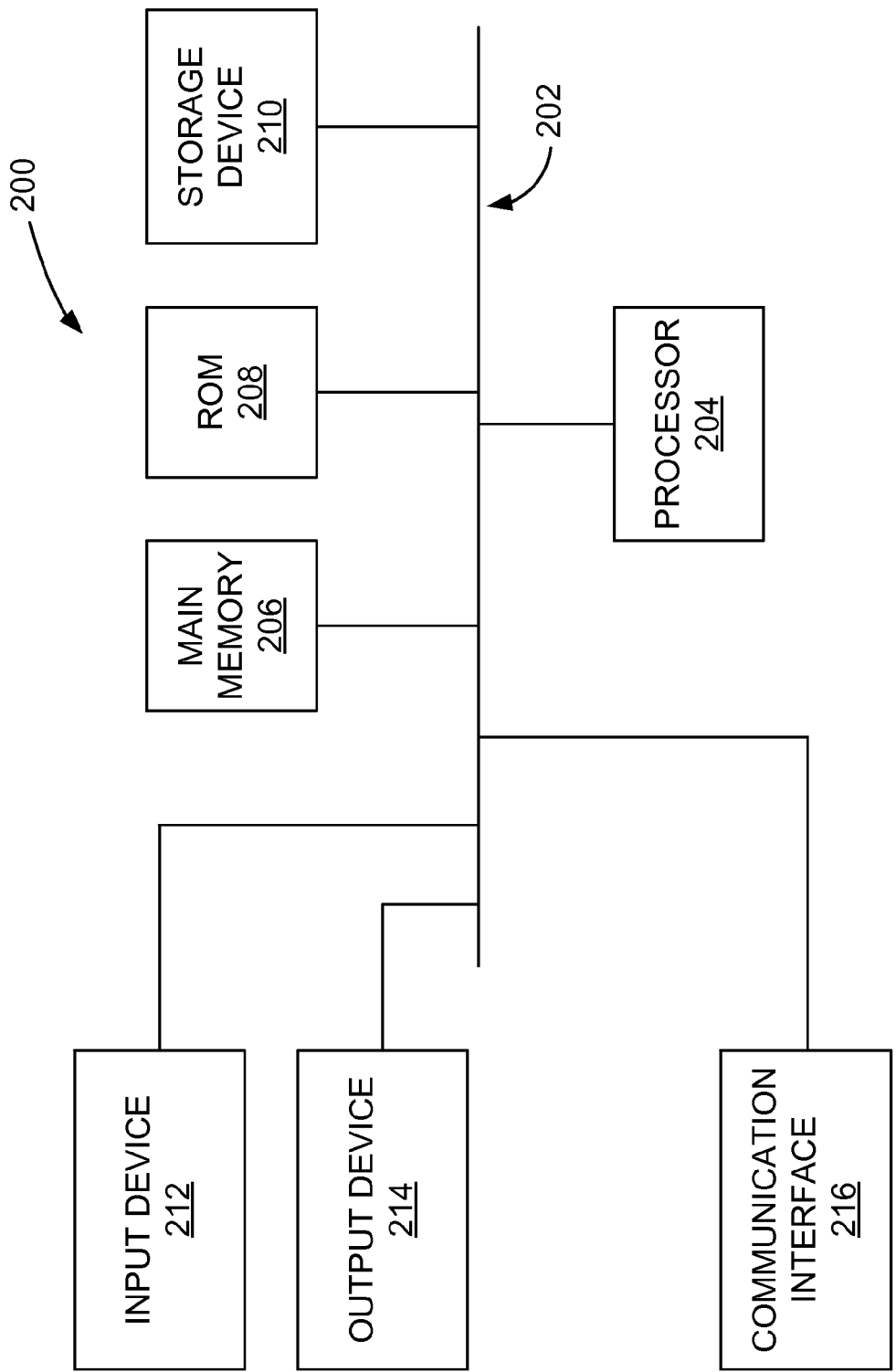
FIG. 2 is a diagram of an example computing device.

FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
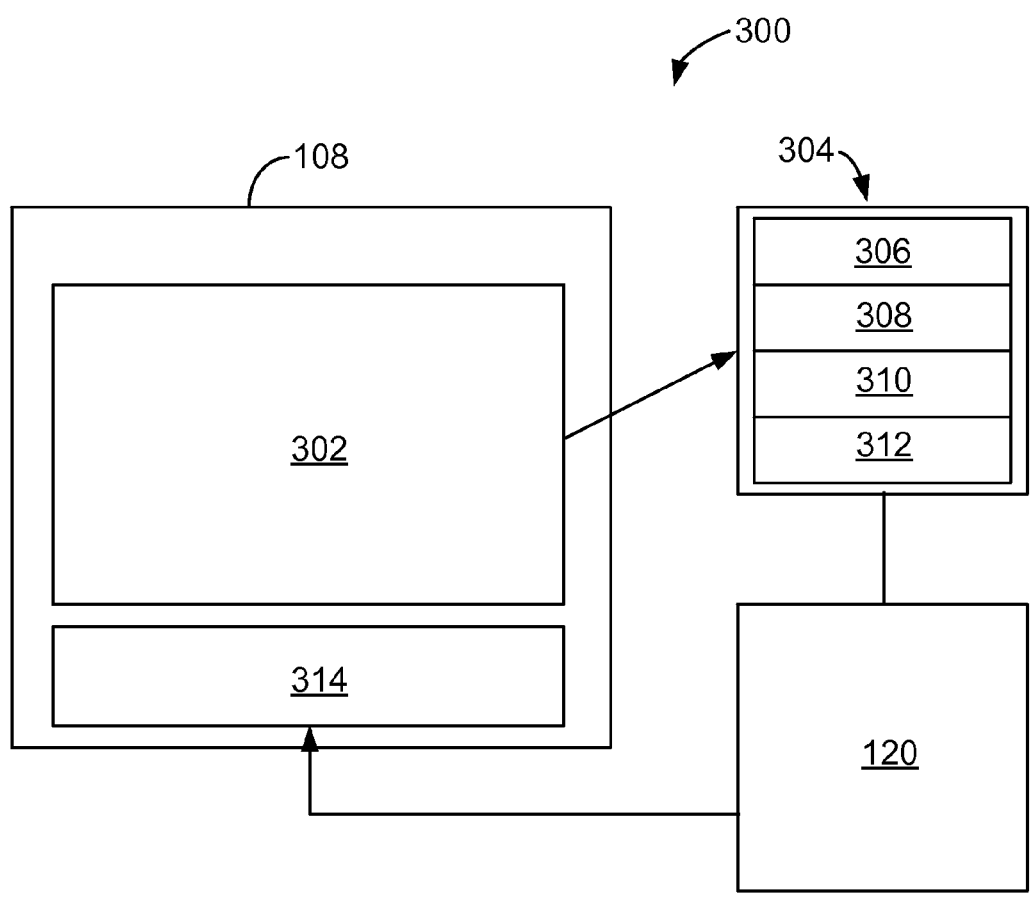
FIG. 3 is a block diagram of a relationship among a publication, verticals associated with the publication, a content serving system, and a content item displayed in combination with the publication.

FIG. 3 is a block diagram of a relationship 300 among a publication 302, a set 304 of verticals 306, 308, 310, and 312 associated with publication 302, content serving system 120, and a content item 314 displayed in combination with publication 302. Publication 302 and content item 314 are displayed on client computing device 108. CMS 106 stores, in a database, for example general database 146, a first vertical 306, a second vertical 308, a third vertical 310, and a fourth vertical 312 in association with publication 302. In other words, verticals 306, 308, 310, and 312 are included in a set 304 of verticals associated with publication 302. As described in more detail herein, each vertical 306, 308, 310, and 312 includes one or more keywords that describe characteristics, such as the subject matter, of publication 302. The verticals 306, 308, 310, and 312 may be automatically generated by CMS 106 or another computing device, for example through object recognition, speech recognition, and/or text analysis, or manually generated by a person providing keywords that describe publication 302. Keywords in each vertical 306, 308, 310, and 312 differ such that content serving system 120, when provided with one of verticals 306, 308, 310, and 312, selects a different content item 314 for presentation with publication 302 than if a different one of verticals 306, 308, 310, and 312 is provided to content serving system 120. Content item 314 is displayed contemporaneously with publication 302.

When content item 314 is presented on client computing device 108, CMS 106 records that an impression or view occurred. If content item 314 is clicked, tapped, or otherwise selected or activated on client computing device 108, client computing device 108 accesses a landing page (i.e., a publication) (not shown) linked to by content item 314. If content item 314 is selected as described above, then CMS 106 records the occurrence of the selection ("click-through"). By dividing the number of click-throughs of content item 314 by the number of impressions of content item 314, CMS 106 determines a click-through-rate (CTR) associated with content item 314 and publication 302. The CTR may be considered an interest level associated with content item 314 and publication 302. If the subject matter of content item 314 is not pertinent to the subject matter of publication 302, the CTR is likely to be lower than if the subject matter of content item 314 is pertinent to the subject matter of publication 302. Accordingly, each vertical 306, 308, 310, and 312, when used by CMS 106 to select a content item for presentation with publication 302 may result in a different CTR for content item 314 and publication 302. Accordingly, CMS 106 may associate an interest level with each vertical 306, 308, 310, and 312.

Figure 4:
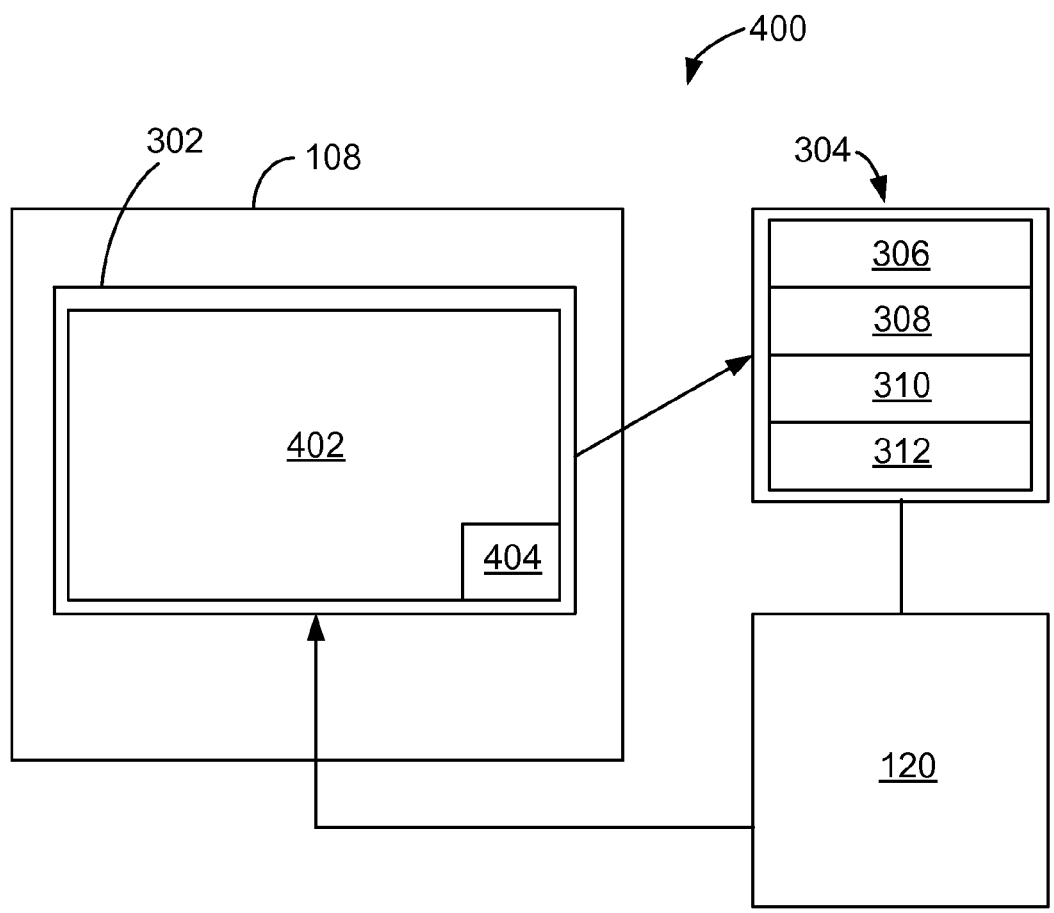
FIG. 4 is a block diagram of a relationship among a publication, verticals associated with the publication, a content serving system, and a content item displayed prior to display of the publication.

FIG. 4 is a block diagram of a relationship 400 among publication 302, vertical 306, 308, 310, and 312 associated with publication 302, content serving system 120, and a content item 402 displayed prior to displaying publication 302 on client computing device 108. More specifically, client computing device 108 executes computer-executable instructions that cause computing device 108 to display content item 402 before displaying publication 302. For example, content item 402 may be a video that plays on client computing device 108 before publication 302 is displayed. When content item 402 begins playing on client computing device 108, CMS 106 records that an impression occurred. A skip button 404 is displayed with content item 402 that, if selected on client computing device 402, causes playback of content item 402 to end before content item 402 has finished playing. If, however, content item 402 finishes playing without skip button 404 being selected, then CMS 106 records that a view-through occurred. CMS 106 determines a view-through-rate (VTR) based on the number of view-throughs divided by the number of impressions. The VTR may be considered an interest level associated with content item 402 and publication 302. If the subject matter of content item 402 is not pertinent to the subject matter of publication 302, the VTR is likely to be lower than if the subject matter of content item 402 is pertinent to the subject matter of publication 302. Accordingly, each vertical 306, 308, 310, and 312, when used by CMS 106 to select a content item for presentation with publication 302 may result in a different VTR for content item 402 and publication 302. Accordingly, and as described above with reference to FIG. 3, CMS 106 may associate an interest level with each vertical 306, 308, 310, and 312.

Figure 5:
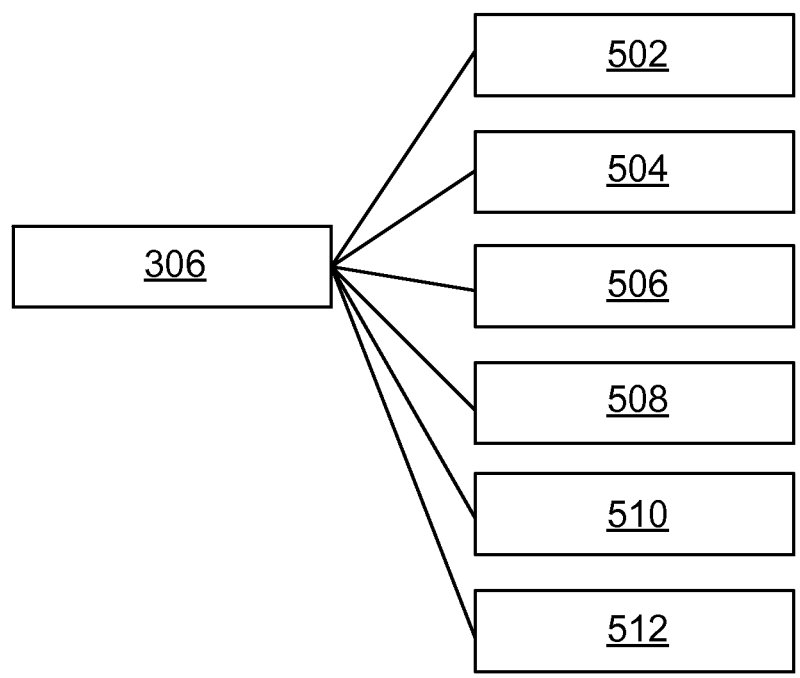
FIG. 5 is a block diagram of a vertical and keywords included in the vertical.

FIG. 5 is a block diagram of vertical 306 and keywords 502, 504, 506, 508, 510, and 512 included in vertical 306. Each of keywords 502, 504, 506, 508, 510, and 512 is based on characteristics of publication 302, as described above. For example, if publication 302 is a video about a particular vehicle, keyword 502 may be "vehicle", keyword 504 may be "automobile", keyword 506 may be "car", keyword 508 may be the make of the vehicle, keyword 510 may be the model of the vehicle, and keyword 512 may be the year of the vehicle. The number of keywords in each vertical 306, 308, 310, and 312 may vary. Additionally, the number of verticals associated with a publication, for example publication 302, may vary. Additionally, CMS 106 may store verticals and associated keywords for a content item, for example content item 314 or content item 402, and compare verticals for content items to verticals for a publication, for example publication 302, when determining which content item to serve for display with a particular publication.

Figure 6:
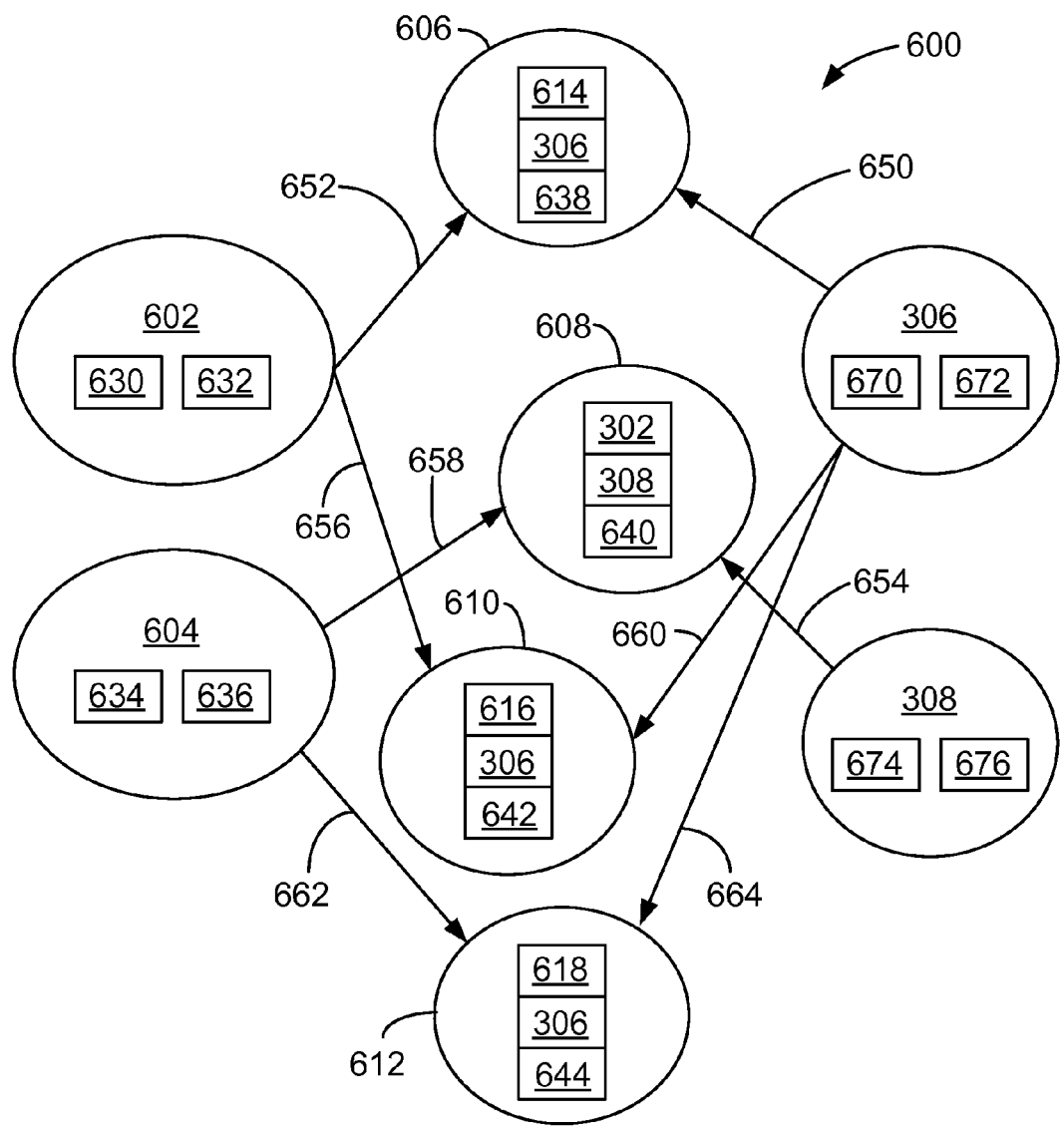
FIG. 6 is a block diagram of a Bayesian network including multiple providers of publications, multiple verticals, combinations of publications and the verticals, and dependencies among the combinations, the verticals, and the providers of publications.

FIG. 6 is a block diagram of a Bayesian network 600. Included as nodes in Bayesian network 600 are a first provider of publications 602 and a second provider of publications 604. A provider of publications may be, for instance, an author of publications or a channel or distribution source through which authors distribute publications. For example, first provider 602 may be a news station that provides, as publications, coverage on current events. Second provider 604 may be, for example, a musician that provides music videos as publications. In some implementations, first provider of publications 602 and second provider of publications 604 provide publications through the same publisher (e.g., web site). In other implementations, first provider of publications 602 and second provider of publications 604 provide publications through different publishers.

Network 600 additionally includes first vertical 306 and second vertical 308 as nodes. Additionally, a first combination 606, a second combination 608, a third combination 610, and a fourth combination 612 are included in network 600. Each of combinations 606, 608, 610, and 612 includes a publication and an associated vertical. More specifically, first combination 606 includes a publication 614 and first vertical 306. Second combination 608 includes publication 302 and second vertical 308. Third combination 610 includes a publication 616 and first vertical 306. Fourth combination 612 includes a publication 618 and first vertical 306. For first provider of publications 602, CMS 106 generates an average interest level 630 (e.g., CTR or VTR) based on individual interest levels for every publication provided by first provider 602. Additionally, CMS 106 determines a variance 632 in the interest levels of the publications provided by first provider 602.

More specifically, if publications from first provider 602 are displayed with content items that are consistently clicked through or viewed through, then average interest level 630 will be a relatively high value and variance 632 will be relatively low. Conversely, if publications from first provider 602 are displayed with content items that are consistently not clicked through or viewed through, then average interest level 630 will be a relatively low value and variance 632 will be relatively low. If certain publications from first provider 602 are displayed with content items that are consistently clicked through or viewed through, while other publications from first provider 602 are consistently not clicked through or viewed through, then average interest level 630 will likely be between a relatively high value and a relatively low value, and variance 632 will be relatively high. Similarly, CMS 106 determines an average interest level 634 and a variance 636 for second provider of publications 604. Similarly, CMS 106 determines average interest levels 670 and 674, and variances 672 and 676, for verticals 306 and 308 respectively.

When first combination 606 is used to select a content item, and the publication 306 and selected content item are presented on one or more client computing device 108, CMS 106 records the occurrence of an impression and potentially the occurrence of a view-through or click-through. Additionally, CMS 106 determines an interest level 638 (e.g., VTR or CTR) associated with combination 606, as described with reference to FIGS. 3 and 4. Likewise, CMS records occurrences of impressions and view-throughs or click-throughs for combinations 608, 610, and 612 and determines corresponding interest levels 640, 642, and 644 for combinations 608, 610, and 612. CMS 106 organizes combinations 606, 608, 610, and 612 and their associated interest levels 638, 640, 642, and 644, determined by CMS 106 as observed quantities in Bayesian network 600. Additionally, CMS 106 organizes first provider of publications 602, second provider of publications 604 and their associated average interest levels 630, 634 and variances 632, 636, as well as first vertical 306 and second vertical 308, as latent variables in Bayesian network 600. Further, CMS 106 determines the dependencies 650, 652, 654, 656, 658, 660, 662, and 664 of the observed quantities on the latent variables using statistical analysis, for example Bayesian analysis.

By determining dependencies 650, 652, 654, 656, 658, 660, 662, and 664, CMS 106 may generate proposed combinations of publications with verticals and predict associated interest levels for the proposed combinations. Additionally, CMS 106 may generate a confidence level associated with each predicted interest level, based at least in part on the variance in the interest levels associated with the provider of the publication and each vertical in each proposed combination. For example a relatively high variance will result in a relatively low confidence level, and vice versa. Bayesian network 600 shown in FIG. 6 is simplified, for clarity. In some implementations, Bayesian network 600 includes additional latent variables, for example verticals 310 and 312, as well as verticals generated based on characteristics of content items, as described with reference to FIG. 5.

Figure 7:
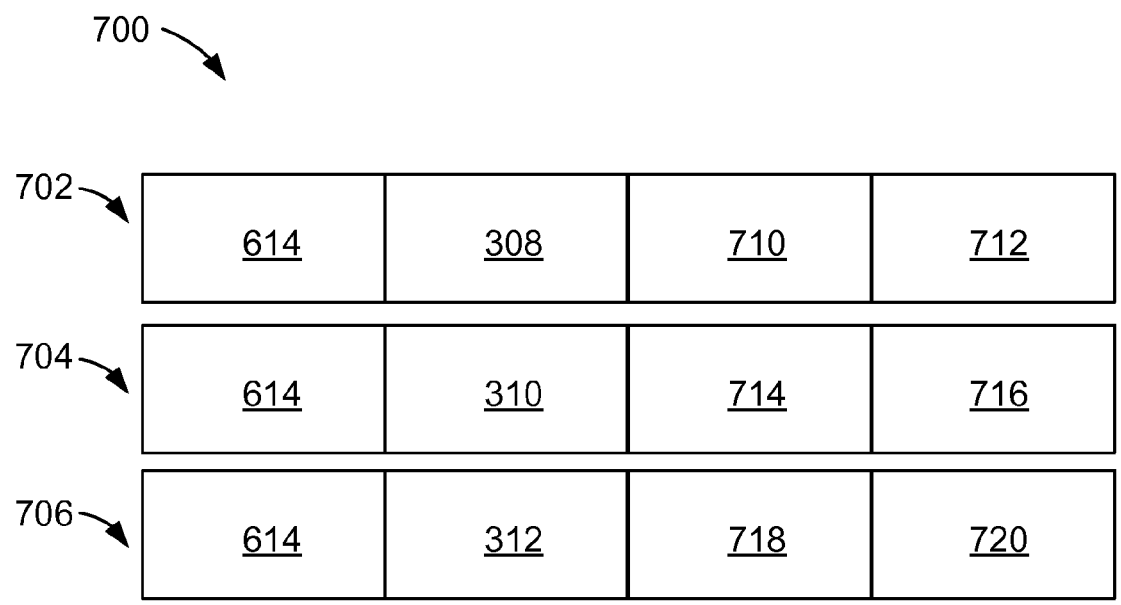
FIG. 7 is a block diagram of a set of proposed combinations of publications, verticals, predicted interest levels, and confidence levels.

FIG. 7 is a block diagram of a set 700 of proposed combinations 702, 704, and 706 generated by CMS 106. First combination 702 includes publication 614 and second vertical 308, and has an associated first predicted interest level 710 and first confidence level 712. Second combination 704 includes publication 614 and third vertical 310, and has an associated second predicted interest level 714 and second confidence level 716. Third combination 706 includes publication 614 and fourth vertical 312, and has an associated third predicted interest level 718 and third confidence level 720. CMS 106 transmits the corresponding publication and a corresponding content item selected based on at least one of proposed combinations 702, 704, and 706 to client computing device 108 for display thereon. In some implementations, CMS 106 ranks combinations 702, 704, and 706 in descending order based on their associated predicted interest levels 710, 714, and 718 multiplied by their associated confidence levels 712, 716, and 720 and transmits the corresponding publication and a corresponding content item selected based on highest ranked combination 702 to client computing device 108 for display. In other words, CMS 106 determines which combination of publication and vertical is most likely to result in a user clicking through or viewing through a content item selected by CMS 106 based on the vertical in the combination, and CMS 106 transmits the publication from the combination and a content item selected based on the vertical in the combination to client computing device 108 for display.

Figure 8:
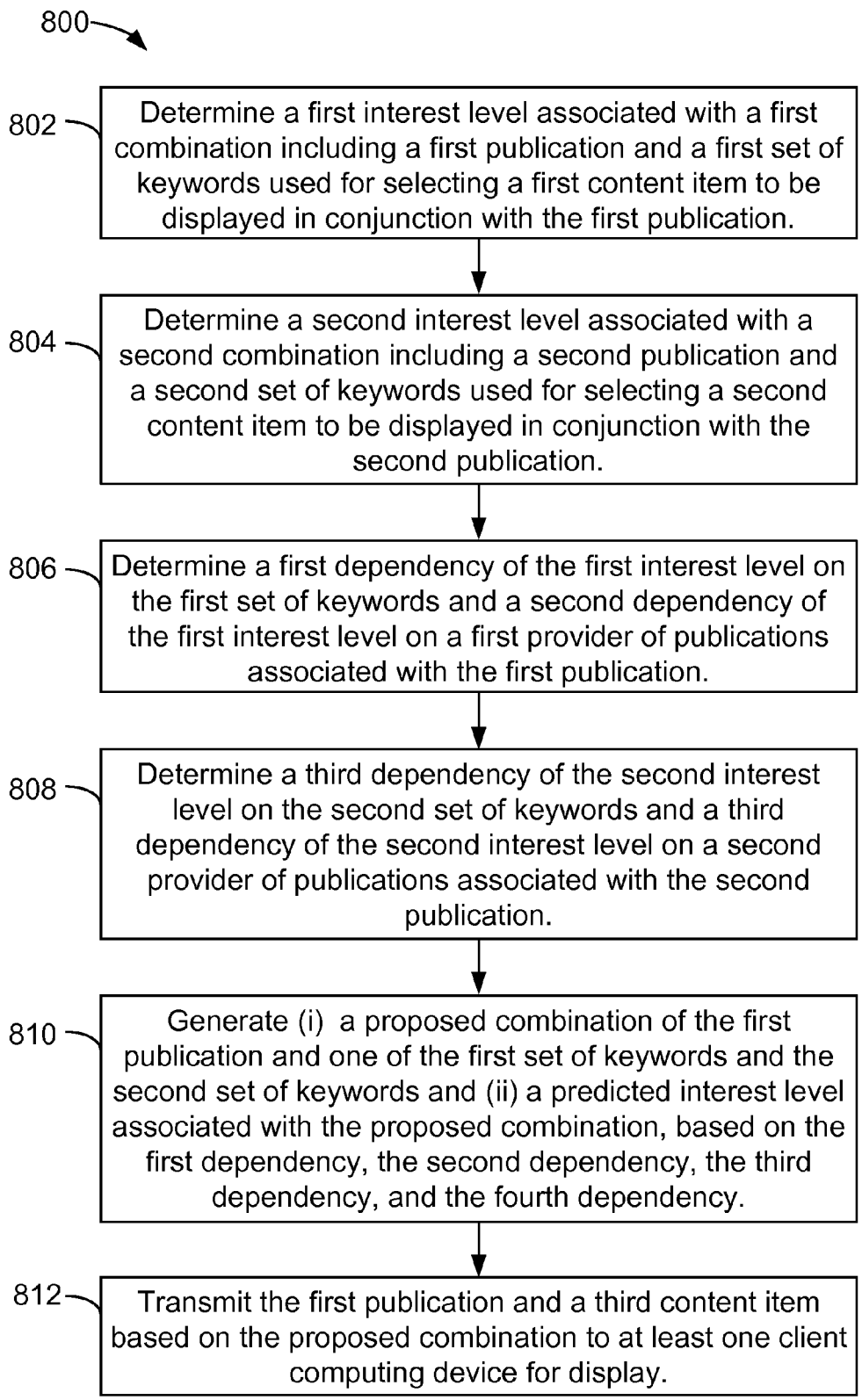
FIG. 8 is a flowchart of a process for predicting interest levels associated with publication and content item combinations.

FIG. 8 is a flowchart of a process 800 for predicting interest levels associated with publication and content item combinations. Initially, CMS 106 determines 802 a first interest level associated with a first combination, for example combination 606 (FIG. 6) and interest level 638. As described above, combination 606 includes publication 614 and vertical 306. As described above, vertical 306 includes a set of keywords used by CMS 106 for selecting a content item, such as content item 314, to be displayed in conjunction with publication 614.

Next, CMS 106 determines 804 a second interest level associated with a second combination, for example combination 608 (FIG. 6) and interest level 640. As described above, combination 608 includes publication 302 and vertical 308. Vertical 308 includes a set of keywords used by CMS 106 for selecting a content item, such as content item 402, to be displayed in conjunction with publication 302. Next, CMS 106 determines 806 a first dependency, for example dependency 650, of the first interest level 638 on the first set of keywords (e.g., vertical 306) and a second dependency (e.g., dependency 652) of the first interest level 638 on first provider of publications 602 associated with publication 614. Next, CMS 106 determines 808 a third dependency (e.g., dependency 654) of the second interest level 640 on the second set of keywords (e.g., vertical 308) and a fourth dependency (e.g., dependency 658) of the second interest level 640 on second provider of publications 604 associated with publication 302.

Next, CMS 106 generates 810 a proposed combination (e.g. proposed combination 702) of publication 614 and one of the first set of keywords (e.g. vertical 306) and the second set of keywords (e.g. vertical 308) and a predicted interest level (e.g. predicted interest level 710) associated with the proposed combination 702, based on the first dependency 652, the second dependency 650, the third dependency 656, and the fourth dependency 654. More specifically, and as described with reference to FIGS. 6 and 7, CMS 106 uses statistical analysis to determine the dependency of the determined interest levels 638 and 640 for combinations 606 and 608 on the latent variables (i.e., providers of publications 602 and 604 and verticals 306 and 308), thereby enabling CMS 106 to generate predicted interest level 710 for proposed combination 702. In some implementations, CMS 106 additionally transmits the publication 614 and a content item (e.g. content item 402) based on the proposed combination 702 to at least one client computing device 108 for display. More specifically, in such implementations, CMS 106 selects a content item (e.g., content item 402) based on the vertical 308 in combination 702 and transmits both publication 614 and the selected content item (e.g., content item 402) to at least one client computing device 108 for display. In some implementations, CMS 106 generates a proposed combination for every possible combination of publication and vertical, and determines a predicted interest level and variance for every proposed combination. In some implementations, CMS 106 identifies one or more proposed combinations with predicted interest levels greater than a predetermined threshold.

Figure 9:
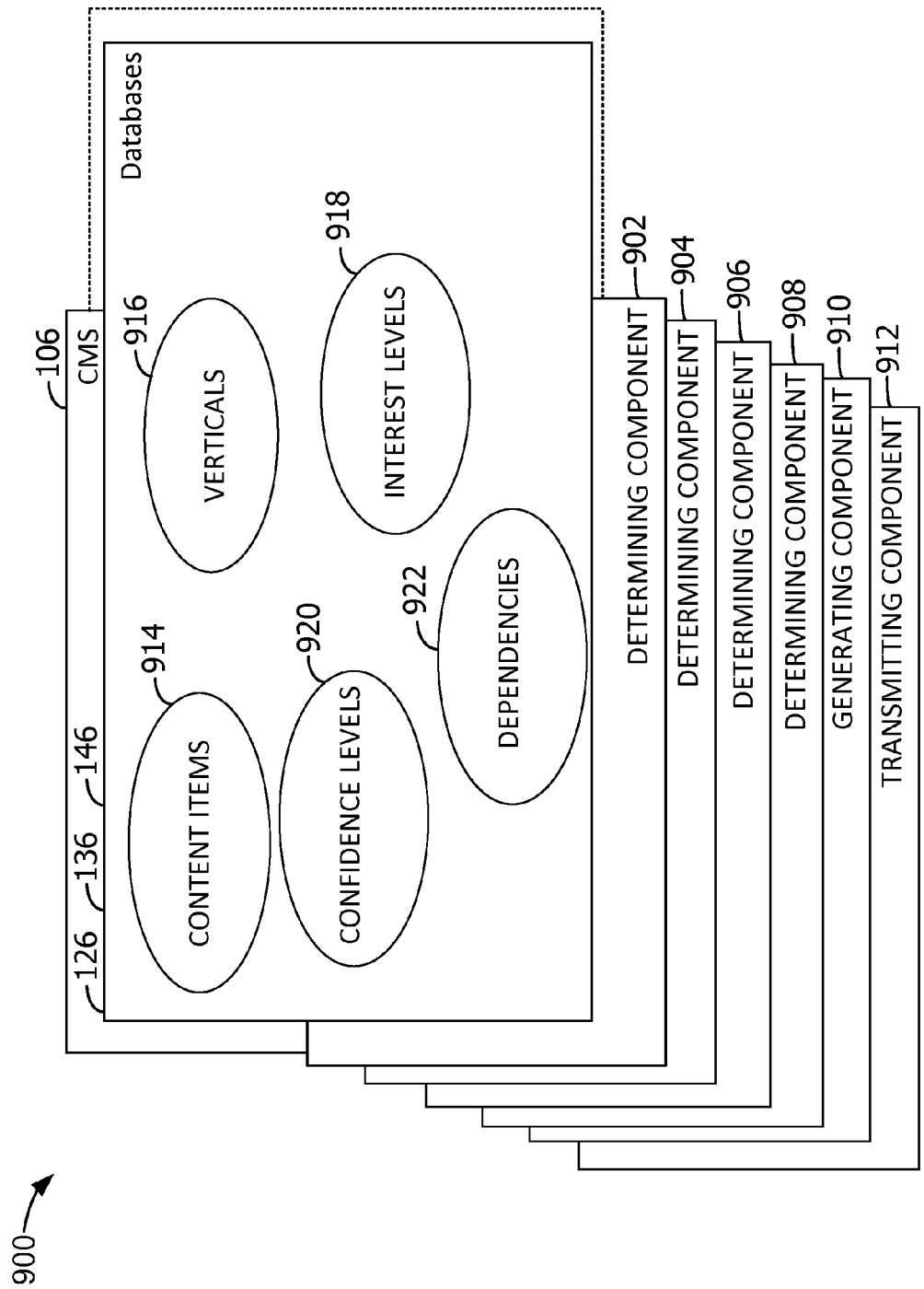
FIG. 9 is a diagram of components of one or more example computing devices that may be used in the environment shown in FIG. 1.

FIG. 9 is a diagram 900 of components of one or more example computing device 200, that may be used in the environment shown in FIG. 1. For example, one or more of computing devices 200 may form content management system (CMS) 106. FIG. 9 further shows a configuration of databases 126, 136, and 146 (FIG. 1). Databases 126, 136, and 146 are coupled to several separate components within CMS 106, which perform specific tasks.

CMS 106 includes a determining component 902 for determining a first interest level associated with a first combination including a first publication and a first set of keywords used for selecting a first content item to be displayed in conjunction with the first publication, as described with reference to step 802 (FIG. 8). Additionally, CMS 106 includes a determining component 904 for determining a second interest level associated with a second combination including a second publication and a second set of keywords used for selecting a second content item to be displayed in conjunction with the second publication, as described with reference to step 804 (FIG. 8). CMS 106 also includes a determining component 906 for determining a first dependency of the first interest level on the first set of keywords and a second dependency of the first interest level on a first provider of publications associated with the first publication, as described with reference to step 806 (FIG. 8). Additionally, CMS 106 includes a determining component 908 for determining a third dependency of the second interest level on the second set of keywords and a third dependency of the second interest level on a second provider of publications associated with the second publication, as described with reference to step 808 (FIG. 8). Further, CMS 106 includes a generating component 910 for generating (i) a proposed combination of the first publication and one of the first set of keywords and the second set of keywords and (ii) a predicted interest level associated with the proposed combination, based on the first dependency, the second dependency, the third dependency, and the fourth dependency, as described with reference to step 810 (FIG. 8).

In an example embodiment, databases 126, 136, and 146 are divided into a plurality of sections, including but not limited to, a content items section 914, a verticals section 916 which may include verticals generated based on characteristics of publications and/or verticals generated based on characteristics of content items, an interest levels section 918, which may include determined interest levels and/or predicted interest levels, a confidence levels section 920 which includes confidence levels associated with predicted interest levels, and a dependencies section 922 which includes data (e.g., numeric values) indicating the dependency of observed quantities on latent variables in Bayesian network 600 (FIG. 6). These sections within databases 126, 136, and 146 are interconnected to perform the functions described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description may present features in terms of algorithms and symbolic representations of operations on information. Such algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method of predicting interest levels associated with publication and content item combinations, the method implemented by a server computing device communicatively coupled to at least one client computing device, the method comprising:
   determining a first interest level associated with a first combination including a first publication and a first set of keywords used for selecting a first content item for display in conjunction with the first publication, the first interest level representing a click-through-rate associated with the first content item and the first publication;
   determining a second interest level associated with a second combination including a second publication and a second set of keywords used for selecting a second content item for display in conjunction with the second publication, the second interest level representing a click-through-rate associated with the second content item and the second publication;
   identifying a first dependency that indicates a proportion of the first interest level attributable to the first set of keywords;
   identifying a second dependency that indicates a proportion of the first interest level attributable to a first provider of publications associated with the first publication;
   identifying a third dependency that indicates a proportion of the second interest level attributable to the second set of keywords;
   identifying a fourth dependency that indicates a proportion of the second interest level attributable to a second provider of publications associated with the second publication; and
   generating (i) a proposed combination of the first publication and one of the first set of keywords and the second set of keywords and (ii) a predicted interest level associated with the proposed combination, based on the first interest level, the second interest level, the first dependency, the second dependency, the third dependency, and the fourth dependency, wherein generating the predicted interest level comprises determining a predicted interest level associated with each combination of the first publication and one of the first set of keywords and the second set of keywords, and generating the proposed combination comprises identifying which combination of the first publication and one of the first set of keywords and the second set of keywords has a highest predicted interest level.

2. The method of claim 1 further comprising transmitting the first publication and a third content item based on the proposed combination to the at least one client computing device for display.

3. The method of claim 1, further comprising:
   including the first set of keywords in a first vertical; and
   including the second set of keywords in a second vertical.

4. The method of claim 1, wherein determining the first interest level comprises one of determining a click through rate and a view through rate of the first content item.

5. The method of claim 1, further comprising determining an average interest level for each of the first provider of publications and the second provider of publications.

6. The method of claim 1, further comprising:
   determining an average interest level associated with the first provider;
   determining a variance in the average interest level associated with the first provider; and generating a confidence level of the predicted interest level based at least in part on the variance.

7. The method of claim 1, further comprising arranging the first combination, the second combination, the first set of keywords, the second set of keywords, the first provider of publications, and the second provider of publications as nodes in a Bayesian network, wherein the nodes are connected by the first dependency, the second dependency, the third dependency, and the fourth dependency.

8. The method of claim 1, wherein the proposed combination is a first proposed combination and the predicted interest level is a first predicted interest level, the method further comprising:
generating at least a second proposed combination and a second predicted interest level associated with the second proposed combination; and
determining that the first predicted interest level is greater than the second predicted interest level.

9. The method of claim 1, wherein determining a third dependency and a fourth dependency further comprises determining a third dependency of the second interest level on second set of keywords and a fourth dependency of the second interest level on a second provider of publications that is different from the first provider of publications.

10. The method of claim 1, wherein determining a second interest level further comprises determining a second interest level associated with a second combination including a second publication and a second set of keywords that is different from the first set of keywords.

11. The method of claim 1, wherein determining a first interest level further comprises determining a first interest level associated with a first combination including a first publication and a first set of keywords, wherein the first set of keywords is based on characteristics of the first publication.

12. The method of claim 1, wherein determining a first interest level further comprises determining a first interest level associated with a first combination including a first publication and a first set of keywords used for selecting a first content item, wherein the first set of keywords is based on characteristics of the first content item.

13. The method of claim 1, wherein determining a first interest level further comprises determining a first interest level associated with a first combination including a first publication and a first set of keywords used for selecting a first content item, wherein the first publication is a video and the first content item is combined with the video such that the first content item is displayed prior to displaying the video on the at least one client computing device.

14. The method of claim 1, wherein the first publication and the second publication are included in a plurality of publications, wherein the first set of keywords and the second set of keywords are included in a plurality of sets of keywords, wherein generating a proposed combination comprises generating a proposed combination for each publication in the plurality of publications and each set of keywords in the plurality of keywords, and wherein generating a predicted interest level further comprises generating a predicted interest level associated with each proposed combination.

15. A server computing device for predicting interest levels associated with publication and content item combinations, said server computing device is communicatively coupled to a database and to at least one client computing device, said server computing device is configured to:
determine a first interest level associated with a first combination including a first publication and a first set of keywords used for selecting a first content item for display in conjunction with the first publication, the first interest level representing a click-through-rate associated with the first content item when displayed with the first publication;
determine a second interest level associated with a second combination including a second publication and a second set of keywords used for selecting a second content item for display in conjunction with the second publication, the second interest level representing a click-through-rate associated with the second content item when displayed with the second publication;
identify a first dependency that indicates a proportion of the first interest level attributable to the first set of keywords;
identify a second dependency that indicates a proportion of the first interest level attributable to a first provider of publications associated with the first publication;
identify a third dependency that indicates a proportion of the second interest level attributable to the second set of keywords;
identify a fourth dependency that indicates a proportion of the second interest level attributable to a second provider of publications associated with the second publication; and
generate (i) a proposed combination of the first publication and one of the first set of keywords and the second set of keywords and (ii) a predicted interest level associated with the proposed combination, based on the first interest level, the second interest level, first dependency, the second dependency, the third dependency, and the fourth dependency, wherein generating the predicted interest level comprises determining a predicted interest level associated with each combination of the first publication and one of the first set of keywords and the second set of keywords, and generating the proposed combination comprises identifying which combination of the first publication and one of the first set of keywords and the second set of keywords has a highest predicted interest level.

16. The server computing device of claim 15, wherein said server computing device is further configured to transmit the first publication and a third content item based on the proposed combination to the at least one client computing device for display.

17. The server computing device of claim 15, wherein said server computing device is further configured to determine the first interest level by one of determining a click through rate and a view through rate of the first content item.

18. The server computing device of claim 15, wherein said server computing device is further configured to determine an average interest level for each of the first provider of publications and the second provider of publications.

19. The server computing device of claim 15, wherein said server computing device is further configured to:
determine an average interest level associated with the first provider;
determine a variance in the average interest level associated with the first provider; and
generate a confidence level of the predicted interest level based at least in part on the variance.

20. The server computing device of claim 15, wherein said server computing device is further configured to arrange the first combination, the second combination, the first set of keywords, the second set of keywords, the first provider of publications, and the second provider of publications as nodes in a Bayesian network, wherein the nodes are connected by the first dependency, the second dependency, the third dependency, and the fourth dependency.

21. The server computing device of claim 15, wherein said server computing device is further configured such that the first publication and the second publication are included in a plurality of publications, the first set of keywords and the second set of keywords are included in a plurality of sets of keywords, generating a proposed combination comprises generating a proposed combination for each publication in the plurality of publications and each set of keywords in the plurality of keywords, and generating a predicted interest level further comprises generating a predicted interest level associated with each proposed combination.

22. A non-transitory computer-readable storage device having processor-executable instructions embodied thereon, for predicting interest levels associated with publication and content item combinations, wherein when executed by a server computing device communicatively coupled to a database and to the at least one client computing device, the processor-executable instructions cause the server computing device to:

determine a first interest level associated with a first combination including a first publication and a first set of keywords used for selecting a first content item for display in conjunction with the first publication, the first interest level representing a click-through-rate associated with the first content item when displayed with the first publication;

determine a second interest level associated with a second combination including a second publication and a second set of keywords used for selecting a second content item for display in conjunction with the second publication, the second interest level representing a click-through-rate associated with the second content item when displayed with the second publication;

identify a first dependency that indicates a proportion of the first interest level attributable to the first set of keywords;

identify a second dependency that indicates a proportion of the first interest level attributable to a first provider of publications associated with the first publication;

identify a third dependency that indicates a proportion of the second interest level attributable to the second set of keywords;

identify a fourth dependency that indicates a proportion of the second interest level attributable to a second provider of publications associated with the second publication; and generate (i) a proposed combination of the first publication and one of the first set of keywords and the second set of keywords and (ii) a predicted interest level associated with the proposed combination, based on the first interest level, the second interest level, first dependency, the second dependency, the third dependency, and the fourth dependency, wherein generating the predicted interest level comprises determining a predicted interest level associated with each combination of the first publication and one of the first set of keywords and the second set of keywords, and generating the proposed combination comprises identifying which combination of the first publication and one of the first set of keywords and the second set of keywords has a highest predicted interest level.

23. The non-transitory computer-readable storage device of claim 22, wherein the first publication and the second publication are included in a plurality of publications, wherein the first set of keywords and the second set of keywords are included in a plurality of sets of keywords, and wherein the processor-executable instruction further cause the server computing device to generate a proposed combination by generating a proposed combination for each publication in the plurality of publications and each set of keywords in the plurality of keywords, and to generate a predicted interest level by generating a predicted interest level associated with each proposed combination.

* * * * *